(12) United States Patent
Jelvis et al.

(10) Patent No.: US 12,106,319 B2
(45) Date of Patent: Oct. 1, 2024

(54) HIERARCHICAL DEMAND FORECASTING MODELING

(71) Applicant: Target Brands, Inc., Minneapolis, MN (US)

(72) Inventors: Tikhon Jelvis, Berkeley, CA (US); Sayon Majumdar, Sunnyvale, CA (US); Jun Qin, Palo Alto, CA (US); Bo Yang, San Francisco, CA (US); Yu Gao, San Francisco, CA (US)

(73) Assignee: Target Brands, Inc., Minneapolis, MN (US)

( * ) Notice: Subject to any disclaimer, the term of this patent is extended or adjusted under 35 U.S.C. 154(b) by 50 days.

(21) Appl. No.: 17/531,106

(22) Filed: Nov. 19, 2021

(65) Prior Publication Data

US 2023/0162217 A1 May 25, 2023

(51) Int. Cl.
*G06Q 30/0201* (2023.01)
*G06F 18/211* (2023.01)
*G06F 18/214* (2023.01)

(52) U.S. Cl.
CPC ....... *G06Q 30/0206* (2013.01); *G06F 18/211* (2023.01); *G06F 18/214* (2023.01)

(58) Field of Classification Search
CPC .. G06F 18/211; G06F 18/214; G06Q 30/0206
See application file for complete search history.

(56) References Cited

U.S. PATENT DOCUMENTS 9,576,262 B2    2/2017 Ganguly et al.
11,182,808 B2 * 11/2021 Ohana ................ G06Q 30/0202
(Continued)

FOREIGN PATENT DOCUMENTS

CN      104794192 B       6/2018
WO   WO-2012148387 A1 * 11/2012 ............. G06Q 10/04
WO   WO-2023028692 A1 *  3/2023 ............. G06Q 10/08

OTHER PUBLICATIONS

Leonard, "Promotional Analysis and Forecasting for Demand Planning: A practical Time Series Approach", with exhibits 1 and 2, SAS Institute Inc., Cary, North Carolina, 2001, 50 pages. (Year: 2001).*

(Continued)

*Primary Examiner* — Pan G Choy
(74) *Attorney, Agent, or Firm* — Merchant & Gould P.C.

(57) ABSTRACT

Methods and systems are described for providing hierarchical demand forecasting for state space reduction. Using a hierarchical architecture, a base model may be trained to capture a range of shared structure in a first data set that can be used to draw inferences on using smaller sets of data representative of the "whole picture." For example, training data may be sampled and prepared and used to train a base model in a first stage. In a next stage, one or more downstream models may be trained on the structure and samples of uncensored demand generated by the base model to produce forecasts for items and locations, including items and locations for which there may be little or no historical data. The downstream models that would otherwise require a large amount of data for training can be generated on demand using less training data, training time, computing processing, and memory.

18 Claims, 4 Drawing Sheets

(56) References Cited

U.S. PATENT DOCUMENTS

| | | | | |
|---|---|---|---|---|
| 2009/0024407 | A1* | 1/2009 | Shan | G06Q 30/0202 |
| | | | | 705/348 |
| 2012/0330724 | A1* | 12/2012 | McCaffrey | G06Q 10/087 |
| | | | | 705/7.35 |
| 2020/0143246 | A1* | 5/2020 | Li | G06F 16/26 |
| 2020/0151748 | A1* | 5/2020 | Saha | G06Q 30/0202 |
| 2020/0311615 | A1* | 10/2020 | Jammalamadaka | G06N 20/20 |
| 2020/0356839 | A1* | 11/2020 | Tocornal | G06N 3/044 |
| 2023/0096700 | A1* | 3/2023 | Wei | G06N 3/0442 |
| | | | | 382/157 |

OTHER PUBLICATIONS

Nespoli et al., "Hierarchical demand forecasting benchmark for the distribution grid", Elsevier, Electric Power Systems Research, Aug. 2020. (Year: 2020).*

Mancuso et al., "A machine learning approach for forecasting hierarchical time series", Expert System with Applications, Apr. 21, 2021, Published by Elsevier Ltd. (Year: 2021).*

Gili et al., "Hierarchical linear mixed models in multi-stage sampling soil studies", Environmental and Ecological Statistics (2013) 20: 237-252; vol. 20, No. 2. Springer. (Year: 2013).*

Gili et al., "Hierarchical linear mixed models in multi-stage sampling soil samples," Environmental and Ecological Statistics, vol. 20, No. 2, pp. 237-252, DOI 10.1007/s10651-012-0217-0 (2013).

Ho et al., "A Bayesian hierarchical model for demand curve analysis," Stat Methods Med Res, vol. 27, No. 7, pp. 2038-2049, doi:10.1177/0962280216673675 (Jul. 2018).

Hosseinalipour et al., "Multi-Stage Hybrid Federated Learning over Large-Scale D2D-Enabled Fog Networks," arXiv:2007.09511v4 [cs.NI], 37 pages (Oct. 26, 2020).

Jha et al., "Clustering to Forecast Sparse Time-Series Data," IEEE 31st International Conference on Data Engineering (ICDE), 12 pages, DOI:10.1109/ICDE.2015.7113385 (2015).

Mendes et al., "Multi-Stage Transfer Learning with an Application to Selection Process," 24th European Conference on Artificial Intelligence—ECAI 2020, Santiago de Compostela, Spain, 8 pages (2020).

Mikolov et al., "Distributed Representations of Words and Phrases and their Compositionality," Advances in Neural Information Processing Systems, pp. 3111-3119 (2013).

Tahmassebi et al., "Multi-stage optimization of a deep model: A case study on ground motion modeling," PLoS ONE 13(9): e0203829, https://doi.org/10.1371/journal.pone.0203829, 23 pages (2018).

Yu et al., "A Multistage Training Framework for Acoustic-to-Word Model," Interspeech 2018, pp. 786-790, 10.21437/ Interspeech. 2018-1452 (2018).

Zhou et al., "A Multistage Deep Transfer Learning Method for Machinery Fault Diagnostics Across Diverse Working Conditions and Devices," IEEE Access, vol. 8, pp. 80879-80898, Digital Object Identifier 10.1109/ ACCESS.2020.2990739 (2020).

* cited by examiner

HIERARCHICAL DEMAND FORECASTING MODELING

BACKGROUND

Machine learning models are often used to solve data-oriented problems, such as demand forecasting. For example, multiple different demand forecasting models may be used in a variety of environments for generating different types of forecasts, and using different types of data model features. As an example, a retail enterprise may use a variety of demand forecasting models to model price elasticity, clearance demand, item demands, etc.

Oftentimes, training of machine learning models requires use of large data sets to provide an adequate baseline to establish appropriate model behavior. While use of such large data sets can improve accuracy of trained models, it can also increase complexity and the amount of time and computing resources required to perform the training. Additionally, large data sets may oftentimes include imbalanced and heterogenous data, which can make learning the structure of the data and making predictions on the data difficult. A method and system for expanding the scope of forecasts and for developing new forecasting models efficiently is needed.

SUMMARY

In accordance with the following disclosure, the above and other issues are addressed by the following.

In a first aspect, a system for providing multi-stage demand forecasting includes at least one processor and a memory coupled to the at least one processor. The memory includes instructions that when executed by the at least one processor cause the system to: in a first stage: generate a plurality of batches of training data from item data and item selection data; and train a base model using the plurality of batches of training data to learn an uncensored demand structure for the training data and to generate embeddings. The instructions further cause the system to, in a next stage: use the learned uncensored demand structure and the embeddings from the base model to train one or more different demand models to generate different forecasts.

In another aspect, a method includes, in a first stage: generating a plurality of batches of training data from item data and item selection data; and training a base model using the plurality of batches of training data to learn an uncensored demand structure for the training data and to generate embeddings. In a next stage executed after the first stage, the method includes using the learned uncensored demand structure and the embeddings from the base model to train one or more different demand models to generate different forecasts.

In a further aspect, a non-transitory computer-readable storage medium comprising computer-executable instructions stored thereon is disclosed. The instructions are executable by a processor, wherein, when executed, the instructions cause the processor to perform: in a first stage: generating a plurality of batches of training data from item data and item selection data; and training a base model using the plurality of batches of training data to learn an uncensored demand structure for the training data and to generate embeddings. The instructions further cause the processor to perform, in a next stage executed after the first stage: using the learned uncensored demand structure and the embeddings from the base model to train one or more different demand models to generate different forecasts.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

As briefly described above, embodiments of the present invention are directed to methods and systems for providing hierarchical demand forecasting for state space reduction. Using a hierarchical architecture, demand forecasting can be scaled along two axes: coverage and performance. For example, coverage can be expanded to extrapolate demand for items that may have little or no historical data and/or for new locations. Additionally, performance may be scaled to train a plurality of models to generate forecasts for a range of demand forecasting purposes while reducing the amount of training data, training time, and computing resources required. Moreover, the plurality of models can be easily tuned based on new requirements, and new models may be built for new use cases.

Generation of demand forecasting models using the hierarchical modeling architecture techniques described herein may train a structure model to capture a range of shared structure in a large data set that can be used to draw inferences on using smaller sets of data representative of the "whole picture." For example, training data may be sampled and prepared and used to train a base model in a first stage. In a next stage, one or more downstream models may be trained on the structure and samples of uncensored demand generated by the base model to produce forecasts for items and locations, including items and locations for which there may be little or no historical data.

Overall, generation of demand forecasting models using the hierarchical modeling architecture techniques described herein has a number of advantages. For example, use of multi-stage modeling enables a real-time generation of special-purpose models using less data and computing resources. That is, specialized models that would otherwise require a large amount of data for training can be generated with less training data, training time, computing processing, and memory. Still further, such specialized models will not lose insights that may be available from trends occurring across an entire organizational dataset, which may otherwise be overlooked if trained on a more disjoint and focused dataset designed for the specific purpose of that model. As described herein, such improvements address deficiencies that naturally occur in modeling large, imbalanced, and heterogenous datasets.

Figure 1:
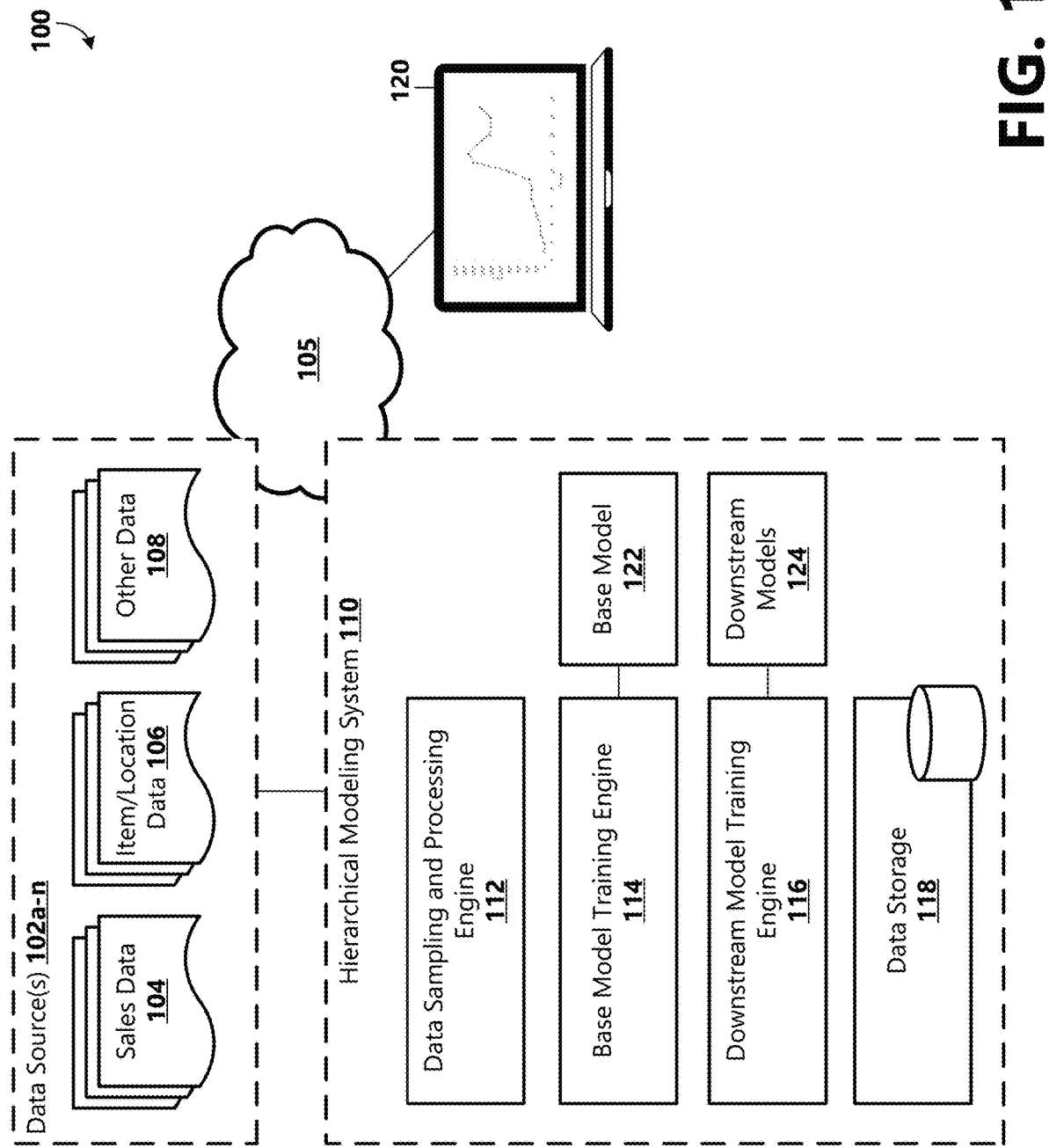
FIG. 1 is an illustration of an example environment in which aspects of the present disclosure may be performed.

Referring to FIG. 1, an operating environment 100 is shown in which a hierarchical modeling system 110 may be implemented for generating a plurality of special-purpose models (represented in FIG. 1 and sometimes referred to herein as downstream models 124) that can be utilized for different forecasting applications, according to an example embodiment. As illustrated, the operating environment 100 may include a plurality of data sources 102 and a computing device 120. In some examples, the hierarchical modeling system 110, data sources 102, and computing device 120 may communicate through one or a combination of computer networks 105 (e.g., an enterprise intranet, the Internet). In some examples, the hierarchical modeling system 110 and/or data sources 102 may expose one or more Application Programming Interfaces (APIs) that allow such computing systems to access and provide data and/or allow the hierarchical modeling system 110 to expose generated downstream models 124 for performing various forecasting determinations.

As will be described in further detail below, the hierarchical modeling system 110 may be utilized to improve scalability of the downstream models 124 (e.g., coverage and performance) while additionally improving flexibility (e.g., increased forecasting granularity). In the example shown, the hierarchical modeling system 110 may include a data sampling and processing engine 112, a base model training engine 114, a downstream model training engine 116, and data storage 118. In some examples, each component (e.g., the data sampling and processing engine 112, base model training engine 114, downstream model training engine 116, and data storage 118) may be separate components that can be connected through one or more interfaces. For example, the one or more interfaces can include APIs that allow the various components to communicate. In other examples, one or more of the components may be combined.

Figure 2:
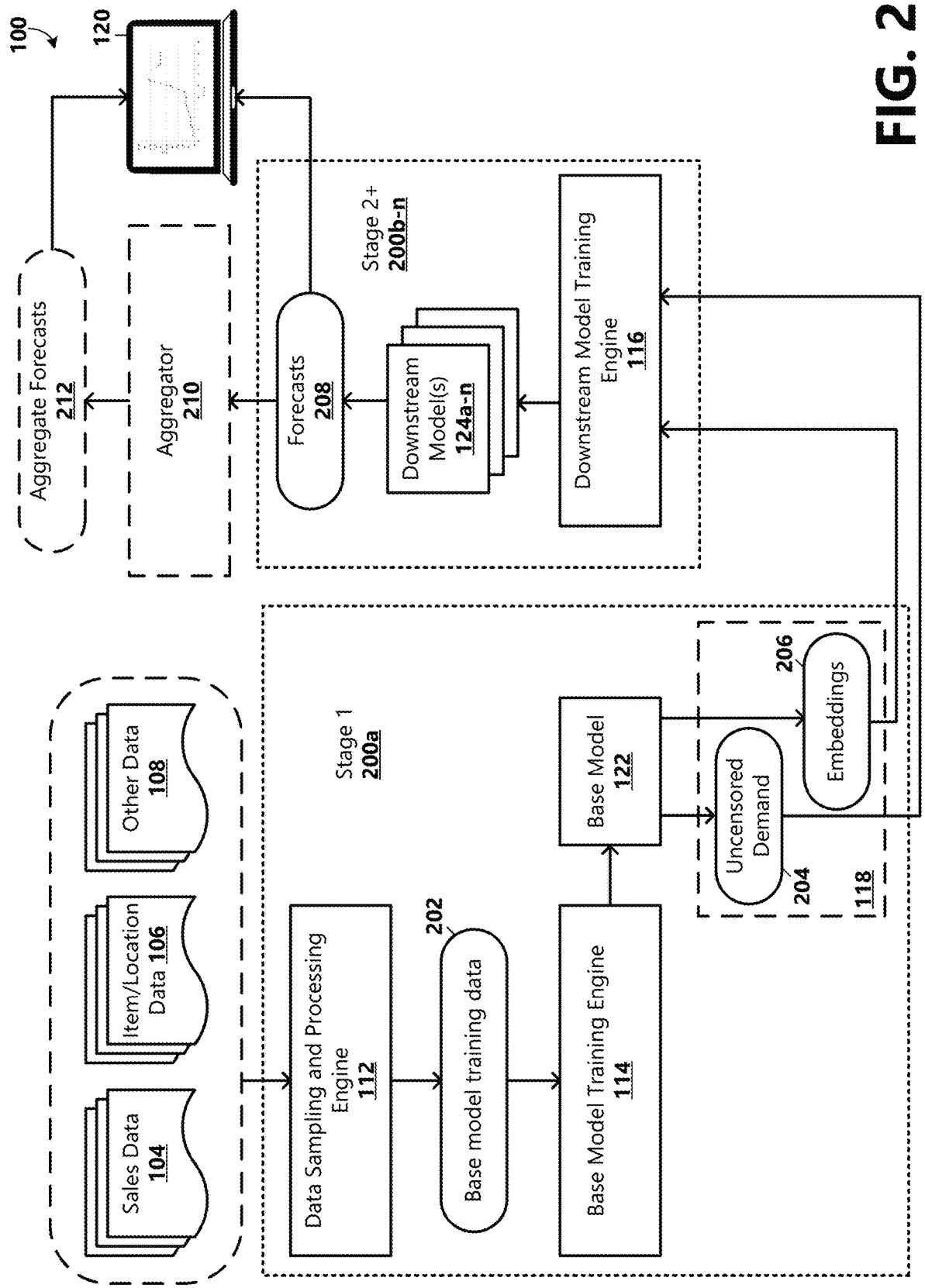
FIG. 2 is an illustration showing an example of utilizing aspects of a hierarchical modeling system for improving computing efficiency and scalability of use relative to developing forecasting models, according to an example embodiment.

With reference now to FIG. 2, a diagram is provided that illustrates an example hierarchical modeling system 110 and a plurality of modeling stages 200a, 200b-n that the example hierarchical modeling system 110 may be configured to use to provide scalable and flexible demand modeling.

In some examples, the data sampling and processing engine 112 is illustrative of a software application, module, system, or device operable or configured to perform processes for sampling and preparing data for training a base model 122. During the first stage 200a, the data sampling and processing engine 112 may operate to access one or more large datasets provided by one or more data sources 102. The one or more data sources 102 may be external to the hierarchical modeling system 110, or in other implementations, may be housed within the hierarchical modeling system 110.

For example, the one or more large datasets may include sales data 104, item and location data 106, and other data 108. In some examples, the item and retail location data 106 may include a comprehensive collection of items offered by a retail enterprise, and may include item identifiers, item descriptive information (e.g., item classification, item title, item description, item cost, item image, and/or other types of descriptive item information), item location information, etc. For example, item location information may include information about a physical retail location of the retail enterprise at which the particular item may be offered or stocked. In some examples, item location information may further include information about whether the item is offered at an online retail site associated with the retail enterprise. In some examples, the sales data 102 may include information about sales activity associated with the items included in the collection of item and location data 106. In some examples, the sales data 102 may include selling prices of items, date and time stamp information, etc. In some examples, other data 108 may include information about other features that may be associated with an item that may have a relationship with demand for the item.

In some examples, the data sampling and processing engine 112 may operate to select randomly sampled mini batches of data from the large data sets (e.g., sales data 104, item and location data 106, and other data 108), and prepare the data for training the base model 122. The data sampling and processing engine 112 may be configured to select a number (N) of sets of item-location data pairs from the large dataset of item and location data 106, and obtain item and location attributes included in the item and location data 106. Further, the data sampling and processing engine 112 may operate to randomly select and obtain a time window (e.g., of a predetermined or configurable size) of historical sales data 104. In one illustrative example, the data sampling and processing engine 112 may be configured to randomly selected N 28-day time windows of historical sales data 104. For example, the time window size may be determined based on optimizing between sample size and Graphics Processing Unit (GPU) resources that may be used to train the base model 122. As can be appreciated, some retail enterprises may have access to large data sets that can be used as training data. As an example, a retail enterprise may have hundreds or thousands of retail locations, comprising, for example, 150 departments, each which may include hundreds or thousands of items. As such, sampling representative mini batches of data rather than using the complete data set associated with each item and location to train the base model 122 reduces the amount of GPU resources and processing required to train the base model 122.

In some examples, the data sampling and processing engine 112 may further operate to clean up and post-process the obtained item and location data 106 and sales data 104. For example, post-processing may include training a natural language processing (NPL) model on item attributes (e.g., text descriptions, titles) and generating text embeddings for each item. For example, text embeddings may be used to learn a real-valued vector representation for a predetermined fixed size vocabulary from a corpus of text. In this context, a model may be generated from the item description and attributes, which are considered as a sentence, with each attribute name and value being considered a word. This may give a unique representation to each attribute of an item. For example, Pirouette® Crème Filled Wafers Chocolate Fudge Cookies may have attributes such as brand (Pepperidge Farm®), flavor (chocolate fudge), state of readiness (ready to eat), package quantity (1), allergens (Contains: wheat, soy, milk, eggs, hazelnuts) and cookie type (chocolate cookie). In one example, text embeddings may be generated as described in: Tomas Mikolov, Ilya Sutskever, Kai Chen, Greg S Corrado, and Jeff Dean. *Distributed representations of words and phrases and their compositionality. In Advances in neural information processing systems*, pages 3111-3119, 2073. This publication is hereby incorporated by reference in its entirety.

After the data is post-processed, the data sampling and processing engine 112 may further operate to provide the post-processed data, herein referred to as base model training data 202, to the base model training engine 114.

In some examples, the base model training engine 114 is illustrative of a software application, module, system, or device operable or configured to train the base model 122. For example, the base model training engine 114 may be a GPU-enabled computing device (e.g., a GPU node) configured to use a machine learning (ML) framework to train the base model 122. For example, given randomly sampled windows of sales data 104 prepared by the data sampling and processing engine 112, the base model 122 may be trained to learn the structure of demand across different items, locations, and time. In some examples, a bidirectional long short-term memory (LSTM) network structure may be trained to form the base model 122 via a supervised learning method. In other examples, a temporal convolutional network (TCN) or other ML architecture may be used as a base model to be trained, thereby forming a trained base model 122.

In some examples, the base model 122 may be trained to learn a relationship between demand and various exogenous variables (e.g., price-related features, promotion activities, seasonality, holidays, item in-store-display related features, location weather related features). The base model 122 may be further trained to learn how to account for demand censored by inventory availability. To accomplish this, the base model 122 may be configured to work on windows of time-series data. The base model 122 may be further configured to automatically capture complex temporal behavior (e.g., seasonality, crisis events, other events). For example, seasonality may refer to particular times when particular items may spike in demand (e.g., Halloween candy in October; back-to-school supplies in August, etc.) and crisis events may be less predictable in the time at which they occur, but may have predictable demand response (e.g., increase in demand for bottled water and non-perishable food in response to hurricane and/or tornado events). In some examples, the base model 122 may be further configured to automatically capture intrinsic relationships between demand and other explanatory variables not explained by exogenous variables, which may enable the base model 122 be more reactive. In some examples, the base model 122 can be trained offline and incrementally. According to an aspect, the base model 122 may provide a centralized location to integrate new sources of data. For example, the base model 122 may operate to automatically extract and select features from high-dimensional data, such as images of items.

The base model 122 may operate to generate two outputs: uncensored demand 204 for the sampled time windows and embeddings 206. According to an aspect, the embeddings 206 may encode the demand structure learned by the base model 122 along latent dimensions and their interactions with exogenous variables. For example, based on the base model training data 202 being a fair representation of the underlying population, the learned structure may capture the effects across the entire dataset that can be used to make downstream predictions. That is, the underlying population data (e.g., item and location data 106, sales data 104, and other data 108) may include imbalanced and heterogenous data, the structure of which the base model 122 may be trained to capture. For example, the base model 122 may operate to capture the demand structures of items with various lengths of sales histories (e.g., long history, short history, new items), of items from across different departments, classes, styles, etc., and of items across locations of various sizes, formats, location demographic characteristics, etc.

According to an aspect, modeling demand for the retail enterprise may be split into multiple stages 200, wherein each stage 200a,200b-n may have a completely different model (e.g., the base model 122 and the one or more downstream models 124a-n). For example, a second stage 200b may include training one or more downstream models 124a-n to make predictions based on the demand structure learned by the base model 122. Using a multi-stage architecture may allow for the base model 122 to operate offline and incrementally to learn the demand structure, which can be computationally complicated and expensive, while the second stage 220b can approximate the base model 122 with simpler and more explainable downstream models 124a-n. Accordingly, the multi-stage architecture allows for scaling (e.g., coverage and performance) efficiently to all item-location data pairs from the large dataset of item and location data 106 while allowing for efficient downstream model training and implementation. For example, demand can be extrapolated for new and short-history items and/or for new locations. Additionally, the second stage 220b allows for forecasts to be generated quickly, using fewer computational resources.

In some examples, one or more downstream model training engines 116 are illustrative of one or more software applications, modules, systems, or devices operable or configured to train one or more downstream models 124a-n. For example, the one or more downstream model training engines 116 may be GPU-enabled computing devices (e.g., a GPU nodes) configured to use a machine learning (ML) framework to train the one or more downstream models 124a-n. In some examples, the one or more downstream models 124a-n may be trained to find interpretable relationships between uncensored demand 204 and explanatory variables. For example, given a subset of items, locations, and time data enriched with the uncensored demand 204 and inferred structure (e.g., encoded in the embeddings 206) from the base model 122, each of the one or more downstream models 124a-n may be trained to learn a particularize demand feature for a variety of use cases. For example, one or more of the downstream models 124a-n may include regression demand models, such as general linear models (GLMs), Bayesian hierarchical models, etc.

According to an aspect, the output (i.e., forecasts 208) of the downstream models 124a-n may be easier to interpret than output of the base model 122. For example, one or more downstream models 124a-n may be used to model price elasticity, clearance demand forecasts, new items, short-history items, demand forecasts, and the like. As business requirements change for the retail enterprise, the second stage 200b can be tuned without needing to change or retrain the base model 122, thus providing a flexible system.

In some examples, the hierarchical modeling system 110 may further include an aggregator 210. For example, the aggregator 210 may be illustrative of a software application, module, system, or device operable or configured to collect a plurality of forecasts 208 generated by a plurality of downstream models 124a-n to generate aggregate forecasts 212. For example, forecasts 208 and/or aggregate forecasts 212 may be transmitted to a computing device 120, where the forecasts 208 and/or aggregate forecasts 212 may be displayed and/or otherwise evaluated for determining location clustering, assortment planning, promotion analysis, and various other tasks. Examples of forecasts, and specifically of validation of initial stage features generated by the base model 122

Figure 3:
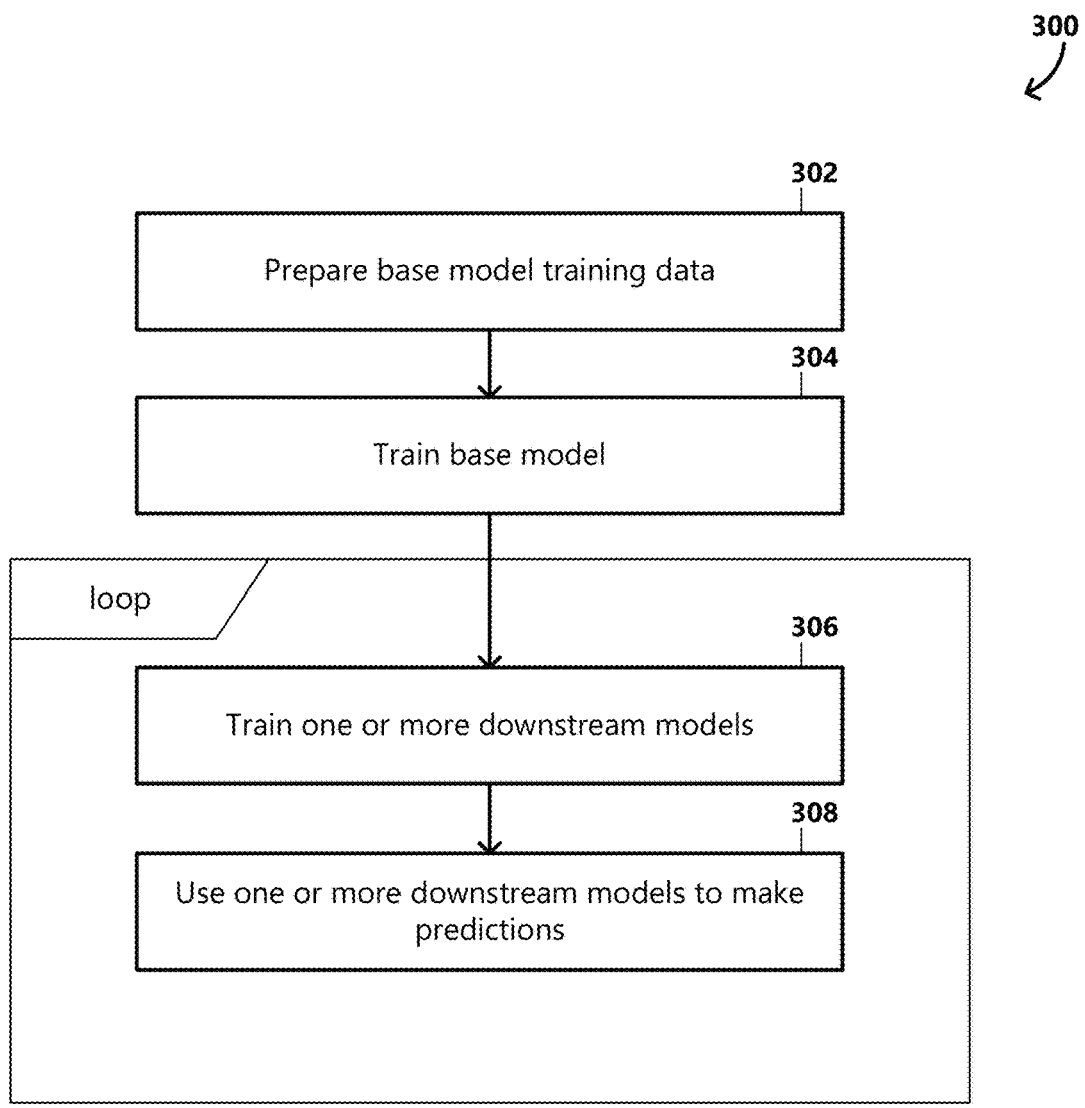
FIG. 3 is a flow diagram depicting general stages of an example process for using the hierarchical modeling system to provide hierarchical demand forecasting, according to an embodiment.

With reference now to FIG. 3, a flow diagram depicting general stages of an example process for using the hierarchical modeling system to improve computing efficiency and scalability of use relative to one or more downstream models 124a-n. At OPERATION 302, the base model training data 202 may be sampled and prepared for training. For example, the data sampling and processing engine 112 may be used to generate mini batches of training data by selecting a number (N) of sets of item-location data pairs from the large dataset of item and location data 106, obtaining item and location attributes included in the item and location data 106, and randomly selecting and obtaining a time window of historical sales data 104. The obtained data may further be and cleaned and post-processed (e.g., text embeddings may be generated from the item and location data 106).

At OPERATION 304, the base model training data 202 may be provided to a GPU node (i.e., the base model training engine 114) for training the base model 114. As described above, the base model 122 may be trained offline and incrementally using the mini batches of base model training data 202. Accordingly, training the base model 122 may have no significant impact on overall training time or model performance.

At OPERATION 306, the output of the base model 122 may be used to train one or more downstream models 124a-n. For example, the one or more downstream models 124a-n may be simpler and faster than the base model 122 and may be trained on the structure (e.g., encoded in the embeddings 206) and samples of uncensored demand 204 to generate forecasts 208 for any item-location data pair. The one or more downstream models 124 may include a plurality of different regression models used, for example, to model a variety of demand features.

At OPERATION 308, one or more of the downstream models 124a-n may be used to generate one or more forecasts 208, which may include price elasticity, clearance demand, new item/short history item demand, etc., which may be used for a wide array of analyses, such as store clustering, assortment planning, promotion analysis, and other tasks. In some examples, the one or more downstream models 124a-n may be quickly and easily adjusted and re-run to assess effectiveness without requiring retraining on the entire dataset (e.g., sales data 104, item and location data 106, and other data 108).

One example downstream model 124 that may be trained using the outputs of the base model 122 may include a model trained to generate a forecast 208 for a new item that was not previously included within the item and location data 106. For example, the example downstream model 124 may obtain a collection of items that have a long history of sales (from the embeddings 206), and identify an item that is most similar to the new item, wherein similarity between items may be defined by similarly in item description, images, or catalog information. The example downstream model 124 may be a regression model used to determine forecasted item demand where nearest neighbors may be used to generate a final forecast 208. For example, effects of seasonality, in-store-display related features, location weather related features, holidays, and the like may be borrowed from items determined to be similar. Additionally, a price adjustment may be made for the final forecast 208 using a log-linear adjustment or other method, which may adjust for differences in price between the items. The example downstream model 124 may be scalable in that although it may generate a forecast 208 for a particular item at a particular location, it can be generally flexible to find similarity in a variety of ways and address data sparsity issues by only considering similar items with adequate history. As can be appreciated, this is just one illustrative example of a downstream model 124 that can be trained in the second stage 202b or in a later stage 202n based on the uncensored demand 204 and embeddings 206 learned by the base model 122.

Figure 4:
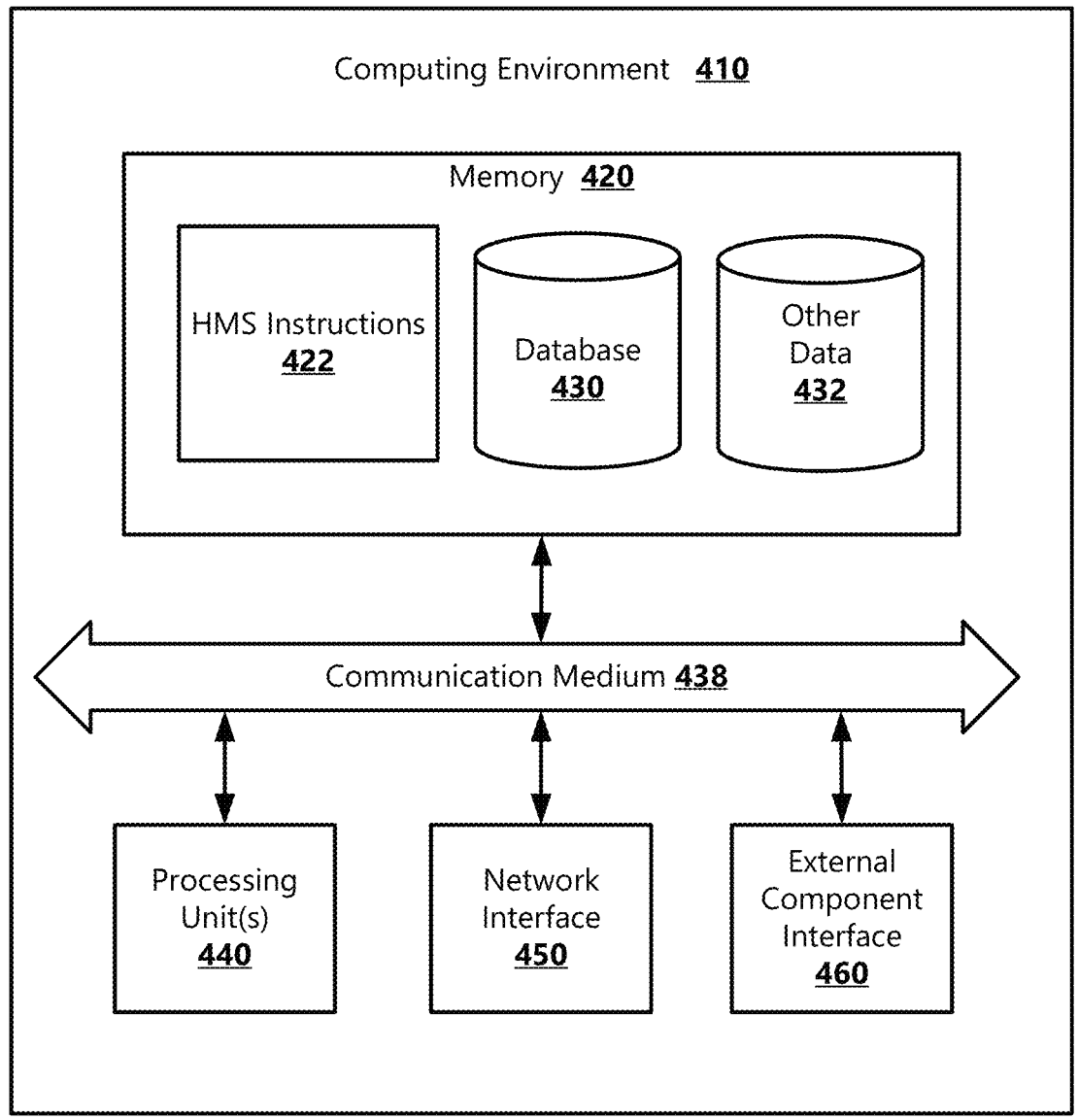
FIG. 4 is a block diagram illustrating example physical components of a computing device or system with which embodiments may be practiced.

FIG. 4 illustrates an example computing system 400 with which aspects of the present disclosure may be implemented. In an example, one or more components of the hierarchical modeling system 110 can be implemented as one or more systems 400 or one or more systems having one or more components of systems 400. In an example, the system 400 can include a computing environment 410. The computing environment 410 can be a physical computing environment, a virtualized computing environment, or a combination thereof. The computing environment 410 can include memory 420, a communication medium 438, one or more processing units 440, a network interface 450, and an external component interface 460.

The memory 420 can include a computer readable storage medium. The computer storage medium can be a device or article of manufacture that stores data and/or computer-executable instructions. The memory 420 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

The memory 420 can store various types of data and software. For example, as illustrated, the memory 420 includes instructions 422 for implementing one or more processes described herein (e.g., as described in relation to FIGS. 1-3), database 430, as well as other data 432. In some examples (e.g., where the computing environment 410 is the hierarchical modeling system 110), the memory 420 can include instructions for: preparing base model training data, training the base model 122, training one or more downstream models 124a-n, and using one or more of the downstream models 124a-n to make predictions.

The communication medium 438 can facilitate communication among the components of the computing environment 410. In an example, the communication medium 438 can facilitate communication among the memory 420, the one or more processing units 440, the network interface 450, and the external component interface 460. The communication medium 438 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communication medium.

The one or more processing units 440 can include physical or virtual units that selectively execute software instructions. In an example, the one or more processing units 440 can be physical products comprising one or more integrated circuits. The one or more processing units 440 can be implemented as one or more processing cores. In another example, one or more processing units 440 are implemented as one or more separate microprocessors. In yet another example embodiment, the one or more processing units 440 can include an application-specific integrated circuit (ASIC) that provides specific functionality. In yet another example, the one or more processing units 440 provide specific functionality by using an ASIC and by executing computer-executable instructions. In particular examples, the one or more processing units 440 may be implemented as either central processing units (CPUs) or graphics processing units (GPUs).

The network interface 450 enables the computing environment 410 to send and receive data from a communication network. The network interface 450 can be implemented as an Ethernet interface, a token-ring network interface, a fiber optic network interface, a wireless network interface (e.g., WI-FI), or another type of network interface.

The external component interface 460 enables the computing environment 410 to communicate with external devices. For example, the external component interface 460 can be a USB interface, Thunderbolt interface, a Lightning interface, a serial port interface, a parallel port interface, a PS/2 interface, and/or another type of interface that enables the computing environment 410 to communicate with external devices. In various embodiments, the external component interface 460 enables the computing environment 410 to communicate with various external components, such as external storage devices, input devices, speakers, modems, media player docks, other computing devices, scanners, digital cameras, and fingerprint readers.

Although illustrated as being components of a single computing environment 410, the components of the computing environment 410 can be spread across multiple computing environments 410. For example, one or more of instructions or data stored on the memory 420 may be stored partially or entirely in a separate computing environment 410 that is accessed over a network.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A system for providing multi-stage demand forecasting, comprising:
   at least one processor; and
   a memory coupled to the at least one processor, the memory including instructions that when executed by the at least one processor cause the system to:
      in a first stage:
         generate a plurality of batches of training data from item data and item selection data; and
         train a base model using the plurality of batches of training data to learn an uncensored demand structure for the training data and to generate embeddings, wherein the base model is a machine learning model; and
      in a next stage:
         use the learned uncensored demand structure and the embeddings from the base model to train a plurality of different demand models, each of the plurality of different demand models generating different forecasts with each of the different forecasts related to a different demand feature; and
      in an aggregation stage downstream of the next stage, aggregate the different forecasts generated from the plurality of different demand models to form an aggregate demand model.

2. The system of claim 1, wherein execution of the next stage occurs at a time decoupled from execution of the first stage.

3. The system of claim 1, wherein the learned uncensored demand structure and the embeddings are provided to the next stage in one or more mini-batches of data for training the plurality of different demand models.

4. The system of claim 1, wherein the base model uses a bidirectional long short-term memory (LSTM) network structure.

5. The system of claim 1, wherein the plurality of different demand models include at least one of a general linear model (GLM) or a Bayesian hierarchical model.

6. The system of claim 1, wherein the plurality of different demand models include two or more of:
   a price elasticity model;
   a clearance demand forecasting model; and
   a new item or short-history item demand forecasting model.

7. A method comprising:
   at a modeling system comprising a plurality of processors and a memory:
      in a first stage:
         generating, via at least one processor of the plurality of processors, a plurality of batches of training data from item data and item selection data from a plurality of data sources; and
         training, via the at least one processor, a base model using the plurality of batches of training data to learn an uncensored demand structure for the training data and to generate embeddings, wherein the base model is a machine learning model; and
      in a next stage executed after the first stage:
         using the learned uncensored demand structure and the embeddings from the base model to train a plurality of different demand models, each of the plurality of different demand models generating different forecasts with each of the different forecasts related to a different demand feature; and in an aggregation stage downstream of the next stage, aggregating the different forecasts generated from the plurality of different demand models to form an aggregate demand model.

8. The method of claim 7, wherein the first stage is performed periodically based on sampled training data.

9. The method of claim 7, wherein the plurality of batches of training data is based on randomly selected batches of item-location pairs.

10. The method of claim 9, wherein, for each item-location pair, item and location attributes are included within the training data.

11. The method of claim 10, wherein the item and location attributes include item images.

12. The method of claim 9, wherein, for each item-location pair, a random set of historical sales data is selected for inclusion in the training data.

13. The method of claim 7, wherein the next stage is temporally decoupled from the first stage.

14. The method of claim 7, wherein the base model uses a bidirectional long short-term memory (LSTM) network structure.

15. The method of claim 7, wherein the plurality of different demand models include at least one of a general linear model (GLM) or a Bayesian hierarchical model.

16. The method of claim 7, wherein the plurality of different demand models include two or more of:
a price elasticity model;
a clearance demand forecasting model; and
a new item or short-history item demand forecasting model.

17. A non-transitory computer-readable storage medium comprising computer-executable instructions stored thereon and executable by a processor, wherein, when executed, the instructions cause the processor to perform:
in a first stage:
generating a plurality of batches of training data from item data and item selection data; and
training a base model using the plurality of batches of training data to learn an uncensored demand structure for the training data and to generate embeddings, wherein the base model is a machine learning model; and
in a next stage executed after the first stage:
using the learned uncensored demand structure and the embeddings from the base model to train plurality of different demand models, each of the plurality of different demand models generating different forecasts with each of the different forecasts related to a different demand feature;
in an aggregation stage downstream of the next stage, aggregating the different forecasts generated from the plurality of different demand models to form an aggregate demand model.

18. The non-transitory computer-readable storage medium of claim 17, wherein:
the base model uses at least one of a bidirectional long short-term memory (LSTM) network structure or a temporal convolutional network (TCN),
the plurality of different demand models include at least one of a general linear model (GLM) or a Bayesian hierarchical model, and
the plurality of different demand models include two or more of: a price elasticity model; a clearance demand forecasting model; and a new item or short-history item demand forecasting model.

* * * * *